(12) United States Patent
Wallace et al.

(10) Patent No.: US 10,269,047 B2
(45) Date of Patent: Apr. 23, 2019

(54) PROVIDING ADVERTISEMENTS IN RESPONSE TO IDLE TIME DURING NAVIGATION ON AN ELECTRONIC DEVICE

(75) Inventors: Jon Wallace, Middlesex (GB); Dominic Butler, Kent (GB); James Mulholland, London (GB)

(73) Assignee: Adobe Inc., San Jose, CA (US)

( * ) Notice: Subject to any disclaimer, the term of this patent is extended or adjusted under 35 U.S.C. 154(b) by 1910 days.

(21) Appl. No.: 12/206,846

(22) Filed: Sep. 9, 2008

(65) Prior Publication Data

US 2014/0249926 A1 Sep. 4, 2014

(51) Int. Cl.
*G06Q 30/02* (2012.01)
(52) U.S. Cl.
CPC ................. *G06Q 30/0277* (2013.01)
(58) Field of Classification Search
USPC ...................................................... 705/14.64
See application file for complete search history.

(56) References Cited

U.S. PATENT DOCUMENTS

| | | | | |
|---|---|---|---|---|
| 7,933,632 B2 * | 4/2011 | Flynt | ..................... | G06F 3/0481 340/995.1 |
| 2007/0186177 A1 * | 8/2007 | Both | ................... | G06F 3/04817 715/764 |
| 2009/0113346 A1 * | 4/2009 | Wickramasuriya | ... | G06F 3/0481 715/825 |
| 2010/0035656 A1 * | 2/2010 | Pan | ....................... | G06F 1/1626 455/566 |

OTHER PUBLICATIONS

"Yahoo! Go. The best Internet experience for your phone. Period." http://mobile.yahoo.com/go, downloaded from the Internet on Sep. 3, 2008.
"Widsets" http://www.widsets.com/info/more.html downloaded from the Internet on Sep. 3, 2008.
"Adobe—Mobile and devices: Adobe Flash Cast," http://www.adobe.com/mobile/solutions/flashcast/ downloaded from the Internet on Sep. 3, 2008.
"Adobe—Mobile and devices: Adobe Flash Cast 2FAQ" http://www.adobe.com/mobile/solutions/faq/flashcast_faq.html downloaded from the Internet on Sep. 3, 2008.
"Adobe Flash Cast 2, Deliver Engaging, Branded Data Services" Adobe Systems Inc. Datasheet.

* cited by examiner

*Primary Examiner* — William A Brandenburg
(74) *Attorney, Agent, or Firm* — Kilpatrick Townsend & Stockton LLP

(57) ABSTRACT

Certain embodiments involve providing advertisements during navigation on an electronic device. For example, when the device is left idle for a period of time because the user of the device has not given a navigation command, the mobile device may present an advertisement. The advertisement may be displayed, for example, until the user returns and gives an additional navigation or other command, ending the idle period.

21 Claims, 3 Drawing Sheets

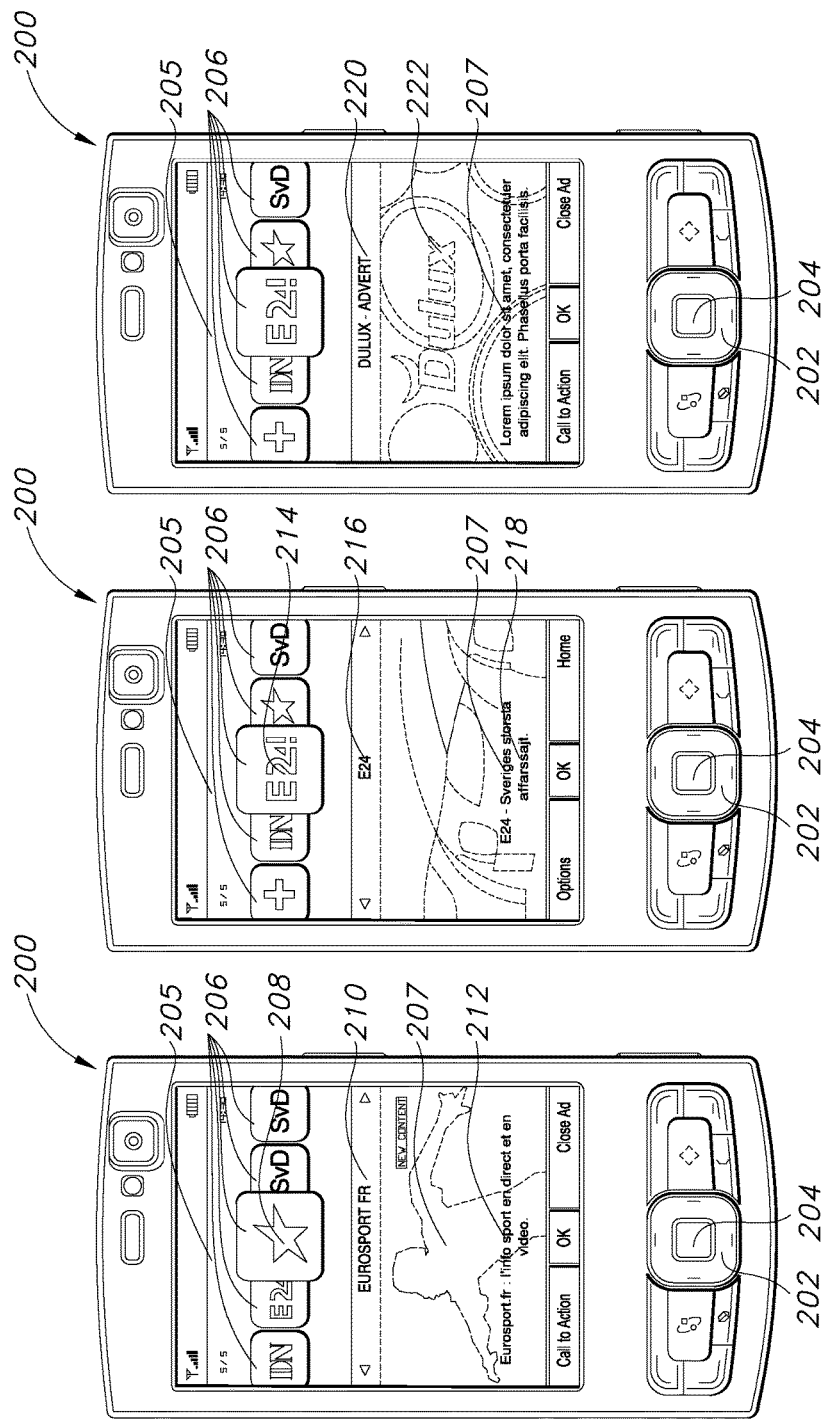

```
┌─────────────────────────────────────────────┐
│   PROVIDING A NAVIGATION AREA FOR AN        │
│              ELECTRONIC DEVICE              │
│                                         510 │
└─────────────────────────────────────────────┘
                      │
┌─────────────────────────────────────────────┐
│    PROVIDING A PREVIEW AREA FOR THE         │
│              ELECTRONIC DEVICE              │
│                                         520 │
└─────────────────────────────────────────────┘
                      │
┌─────────────────────────────────────────────┐
│  MONITORING AN AMOUNT OF IDLE TIME SINCE    │
│  A LAST INPUT ON THE ELECTRONIC DEVICE,     │
│  WHEREIN AN ADVERTISEMENT IS TRIGGERED      │
│  WHEN THE AMOUNT OF IDLE TIME SINCE THE     │
│  LAST INPUT ON THE ELECTRONIC DEVICE        │
│  EXCEEDS A THRESHOLD VALUE            530   │
└─────────────────────────────────────────────┘
                      │
┌─────────────────────────────────────────────┐
│ PROVIDING THE ADVERTISEMENT ON THE          │
│ PREVIEW AREA ON THE ELECTRONIC DEVICE       │
│                                         540 │
└─────────────────────────────────────────────┘
```

FIG. 5

PROVIDING ADVERTISEMENTS IN RESPONSE TO IDLE TIME DURING NAVIGATION ON AN ELECTRONIC DEVICE

FIELD

Embodiments of the present disclosure relate generally to providing content and advertisements to an electronic device.

BACKGROUND

Cell phones and other mobile devices offer a variety of mechanisms for accessing remote content. Such devices commonly include Internet browser applications that allow a user to search for and access Internet content. However, this Internet content search and access process can be time consuming since, in many cases, a user is required to search for content or navigate through multiple web pages and there may be latency involved in the connection between the device and the network. In addition, the content is not available when the mobile device is offline; unable to access the Internet. Some devices include applications that retrieve and cache content for a user so that the user does not need to wait for content to download from a remote source and can access the content even when the device is offline.

Adobe® Flash® Cast™ technology is an offline portal that delivers content as an engaging multimedia experience through Flash® mobile applications called channels. Among other things, it facilitates a subscription form of receiving data for one or more channels on a mobile device. A user can subscribe to a channel using a channel browser that lists the channels available to the device, and can access cached content for subscribed-to channels. To facilitate access of such content, the subscribed-to channels may be presented to a user in a channel lineup on a now-playing screen in which the user is able to preview what is playing on the subscribed-to channels and navigate to and select a particular channel in order to then enjoy the channel's multimedia experience. For example, a news channel may allow a user to navigate through and select from a series of news items that have been previously cached to the mobile device from remote servers; each news item including a thumbnail image, a headline, and a related news story. Upon selection of a news item, the corresponding full body text may be shown. Channels can provide static information and/or interactive content, including content having game, messaging, web interface, and a variety of other components.

SUMMARY

Certain embodiments described herein provide methods and systems for providing advertisements in response to idle time during navigation on an electronic device. Among other contexts, such advertisements may be provided in the context of user navigation accessing content using a mobile device. One exemplary embodiment comprises a method of using idle time to trigger an advertisement during electronic device navigation. This method comprises providing a navigation area comprising items and a focus indicator distinguishing a focused items from the other items within the navigation area. At least a portion of the navigation area is displayed on the electronic device and input on the electronic device changes the focus indicator. For example, a user may enter a command to change the item that is the focused item. The method further comprises providing a preview area for displaying preview content associated with the focused item. The method further comprises monitoring an amount of idle time since a last input on the electronic device. An advertisement is triggered when the amount of idle time since the last input on the electronic device exceeds a threshold value. The advertisement is displayed on the electronic device, for example, within the preview area.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein:

FIG. 2 is an illustration of a mobile device comprising a carousel navigation area, according to certain embodiments;

FIG. 3 is an illustration of the mobile device of FIG. 2 in which the user has changed a focus indicator within the carousel, according to certain embodiments;

FIG. 4 is an illustration of the mobile device of FIGS. 2 and 3 following an idle period, according to certain embodiments; and FIG. 5 is a flow chart illustrating a method of using idle time to trigger an advertisement during electronic device navigation, according to certain embodiments.

DETAILED DESCRIPTION

Figure 1:
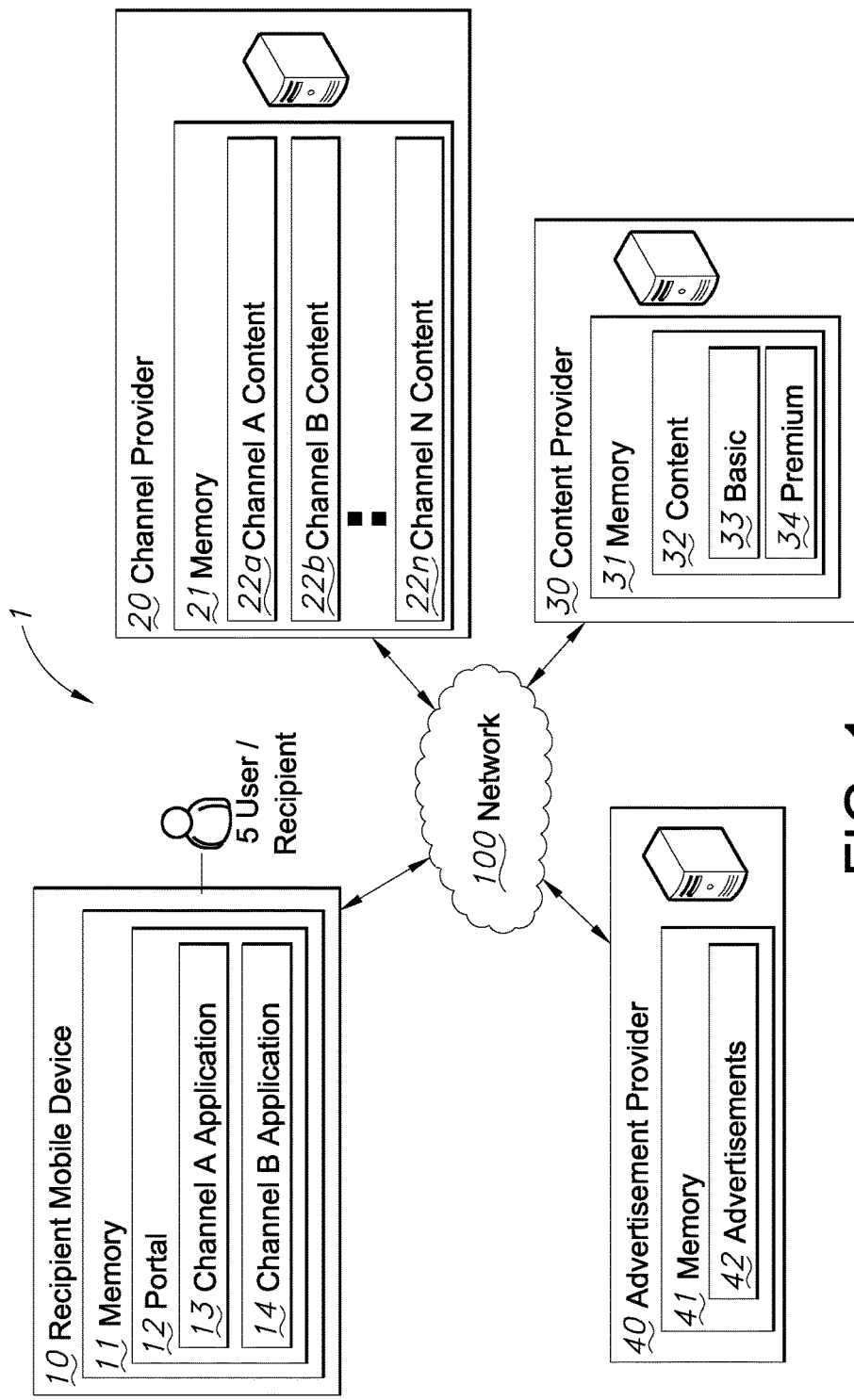
FIG. 1 is a system diagram illustrating an illustrative network environment according to certain embodiments.

Certain embodiments involve providing advertisements during navigation on an electronic device. For example, when the device is left idle for a period of time because the user of the device has not given a navigation command, the mobile device may present an advertisement. The advertisement may be displayed, for example, until the user returns and gives an additional navigation or other command, ending the idle period. An advertisement may include passive items and/or interactive items, including external or website links and functionality to launch other applications, send a message, and link to another source of content. Upon returning from an idle period, a user may decide to interact with the advertisement that is displayed during the idle period and may, as examples, click through an advertisement to learn more, place a phone call to an operator, send a message for more information, and link to an advertisement specific cache on the device, among other things.

Certain embodiments involve providing a carousel of items for a user to navigate through and a preview area for displaying previews associated with the items in the carousel. In this context, the term "carousel" refers to any indexed list that is typically displayed on a horizontal axis. An exemplary carousel is a horizontally aligned list that a user can move through horizontally and that may include scaling and transitional features. Certain embodiments involve a display that includes a carousel portion and a preview portion for displaying a preview of the item that currently has the focus within the carousel. The preview portion can also be used to display an advertisement when the system has been idle for a set period of time. The carousel may generally allow a user to cycle through icons to observe a preview associated with each icon. If the user leaves the screen idle for a period, for example for 5 seconds, the carousel will change into idle advertisement mode and an advertisement will be displayed in the preview portion of the display. To wake the screen, the user can simply begin cycling through the carousel again, for example, using any of the keys of the device, including left/right, to cycle the carousel to one of the other items listed. The user may also be able to action or otherwise select the advertisement using one of the device keys, for example, using one of the labeled soft keys or a center select key on certain devices.

Certain embodiments employ an idle advertisement mode in a carousel interface used in the context of receiving channel content on a mobile device. A "channel" is a placeholder for cached content on a mobile or other electronic device. Channels may be subscription based; such that a user is able to subscribe to the channel and thereafter have the channel's content available from the device's cache. On a mobile device offering content in one or more channels, a user may subscribe to a number of channels and use a carousel interface to preview content available on the various subscribed-to channels. While using the carousel, if the user has not interacted for a set amount of time, an advertisement is overlaid upon the preview portion of the mobile device screen. The advertisement that is presented could be related to a particular subscribed channel in the carousel. For example, if a given channel has the carousel focus when the idle advertisement mode is initiated, an advertisement provided by or otherwise related to that channel may be displayed. Similarly, the advertisement may be related to the specific content in the preview area of the screen and/or to a user's profile, among other things.

A presented advertisement may be positioned in a preview portion of the display of the electronic device and thus may be in the user's direct field of vision. In that location, the advertisement may be more likely to be observed than an advertisement located elsewhere. The presented advertisement may further be configured to attract attention, for example, by mimicking the appearance of substantive content. As a specific example, the advertisement may have the look and feel of a channel preview.

Certain embodiments also provide various advantages with respect to advertising on a mobile phone or other mobile device because screen space on such mobile devices is limited. Advertising in a preview portion of a display during idle periods facilitates the inclusion of advertisements that are large enough to be observed and yet provided in ways that are relatively unobtrusive to the user's experience. The advertisement size and other attributes can be adjusted as appropriate to provide an acceptable content experience that includes an acceptable advertising experience. Among other things, embodiments described herein provide a variety of new opportunities for creating mixed content and advertisement experiences on mobile and other electronic devices.

Illustrative Network Configuration

Referring now to the drawings in which like numerals indicate like elements throughout the several Figures, FIG. 1 is a system diagram illustrating an illustrative network environment according to certain embodiments. Other embodiments may be utilized. The environment 1 shown in FIG. 1 comprises a wired or wireless network 100 connecting various network devices 10, 20, 30, 40. Applications that execute on each of the devices 10, 20, 30, 40 are shown as functional or storage components residing in memory 11, 21, 31, 41 on the respective devices. As is known to one of skill in the art, such applications may be resident in any suitable computer-readable medium and execute on any suitable processor. For example, the network devices 10, 20, 30, 40 shown each may comprise a computer-readable medium such as a random access memory (RAM) 11, 21, 31, 41, coupled to a processor that executes computer-executable program instructions stored in memory 11, 21, 31, 41. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

Recipient mobile device 10 may be used by a mobile device user/recipient 5 to receive content through a channel provider 20 and originating from a content provider 30. The recipient mobile device 10 may also receive advertisements from advertisement provider 40. In this example, recipient mobile device 10 comprises a portal 12 for managing content received for a plurality of channels. Each channel may also be controlled by its own application, in this example, channel A application 13 and channel B application 14, and the portal 12 may facilitate navigation amongst different channel applications 13, 14 and within a given channel application 13, 14. For example, the mobile device user 5 may use the portal 12 to select channel A in a preview carousel interface that allows a user to move through different channels shown as icons on a carousel and observe a preview of what is now playing on the channel in a preview portion of the display.

The content for a channel may be cached on the recipient mobile device 10. For example, a channel application may periodically retrieve content for a channel and store the current content as part of the application within the memory 11 on the recipient mobile device 10. When new content is received for a given channel, the new content can replace some or all of the previously cached content for the channel on the recipient mobile device 10. The recipient mobile device may also cache advertisement content with a channel application 13, 14, within the portal 12, or elsewhere in its memory 11. A channel application 13, 14 may comprise all advertising content.

A channel provider 20 may collect channel content 22 and store such content in memory 20. The channel provider may provide such channel content 22 to subscribers on electronic devices connected at least periodically, for example, through a network 100. A channel provider may comprise more channels than a given electronic device subscribes to and may comprise mechanisms for managing the subscription and access to channel content.

A content provider 30 comprises a memory 31 that stores and distributes content 32 that will be included in a channel's content and ultimately provided to channel subscribers on electronic devices. Similarly, an advertisement provider 40 can store and distribute advertisements 42 that will be included in a channel's content and ultimately provided to channel subscribers on electronic devices. A single physical device, logical unit, or business unit can house one or more channel providers, content providers, and advertisement providers. The components are shown here as single, isolated components for illustrative purposes only.

Illustrative Idle-Triggered Advertisement on a Mobile Device

FIGS. 2-4 illustrate the triggering of an advertisement based on idle time on a mobile device 200, according to certain embodiments. FIG. 2 is an illustration of a mobile device 200 comprising a carousel navigation area 205 and a preview area 207, according to certain embodiments. In FIG. 2, the device 200 displays a carousel 206 in the carousel navigation area 205. The preview portion 207 of the display comprises a preview title 210 and content 212 related to the particular preview 208 being focused on in the carousel 206.

The mobile device 200 also includes a control device 202 for controlling the movement of the focus indicator that identifies which of the carousel items is focused upon. The mobile device 200 further includes a selector device 204. A user can use these physical controls 202, 204 to navigate through interfaces on the mobile device 200 and, in this case, to change which item of the carousel 206 is focused upon. As a specific example, a user can press a left command on the control device 202 to move the focus to an item in the carousel 206 that is to the left of a presently focused item 208. This type of control generally does not allow the user to navigate directly to non-adjacent items, i.e., a user cannot skip items without focusing upon them.

FIG. 3 is an illustration of the mobile device 200 of FIG. 2 in which the user has changed a focus indicator within the carousel, according to certain embodiments. Such a change may have occurred as a result of a mobile device user pressing a left command on control device 202. A different carousel item 214 is now the focus of the carousel 206 and the preview portion 207 of the display has changed to display a different preview title 216 and a different preview 218 associated with the different carousel item 214 that is now the focus of the carousel 206.

FIG. 4 is an illustration of the mobile device 200 of FIGS. 2 and 3 following an idle period, according to certain embodiments. As a result of the mobile device 200 being idle for more than a set period of time, the display has switched to an idle advertisement mode. In this mode, the preview portion 207 is changed to display an advertisement 222 and advertisement title 220. In addition, in the idle advertisement mode, the carousel portion 205 of the display is displayed as inactive, which in this case causes the area of the carousel portion 205 to appear tinted. This example is provided merely to illustrate certain specific features of certain specific embodiments. A wide variety of alternatives may also be employed.

FIG. 5 is a flow chart illustrating a method of using idle time to trigger an advertisement during electronic device navigation, according to certain embodiments. For purposes of illustration only, the elements of this method are described with respect to a particular implementation and with respect to exemplary components illustrated in FIG. 1. A variety of other implementations are also possible.

The method shown in FIG. 5 comprises providing a navigation area for an electronic device, as shown in block 510. The navigation area comprising a plurality of items, wherein a focus indicator distinguishes an item from other items of the plurality of items within the navigation area. Generally, at least a portion of the navigation area is displayed on the electronic device and input on the electronic device changes the focus indicator. An example of an electronic device is the recipient mobile device 10 of FIG. 1. The portal 12 of the recipient mobile device 10 may provide a navigation area that displays a plurality of items, for example, within a carousel. Such items may correspond, for example, to cached items, including but not limited to cached items corresponding to cached content received on the electronic device from a channel provider 20. A navigation area may be displayed on a variety of devices including mobile devices.

The method shown in FIG. 5 further comprises providing a preview area for the electronic device, as shown in block 520. The preview area displays preview content associated with a focused item of the plurality of items, the focused item of the plurality of items comprising an item distinguished by the focus indicator. In the case where the navigation area comprises a carousel, the preview content may display a preview of content that is now playing on the focused channel. The content that is now playing for the focused channel may have been received from a channel provider remote from the electronic device based on a subscription to the channel.

The method shown in FIG. 5 further comprises monitoring an amount of idle time since a last input on the electronic device, wherein an advertisement is triggered when the amount of idle time since the last input on the electronic device exceeds a threshold value, as shown in block 530.

The method shown in FIG. 5 further comprises providing the advertisement on the preview area on the electronic device, as shown in block 540. The navigation area, including the carousel, may be displayed as inactive while the advertisement is displayed on the preview area.

The advertisement may be interactive and comprise, as examples, a link to content external to the electronic device, a link to content within the electronic device, and/or a graphical element or link that provides a means for triggering the launch of an application or another channel. The advertisement may be provided on the electronic device until input is received on the electronic device. Alternatively, the device may receive input, wherein a first type of input on the electronic device causes removal of the advertisement and a second type of input on the electronic device initiates interactivity with the advertisement. Thus, the advertisement may be interactive. For example, it may comprise a link to content external to the electronic device, a link to content within the electronic device, and/or a graphical element or link that provides a means for triggering the launch of an application or channel.

Illustrative Advertising Business Models

Certain embodiments relate to business models for generating advertising revenue by providing advertisements during navigation on an electronic device. For example, where a channel-related advertisement is provided, the channel provider can charge an advertising party for that advertisement. A channel portal application on the mobile device may track advertisement usage and provide information about such usage to a channel provider, an advertisement provider, and other recipients. Various advertising fee structures are also possible. For example, an advertising party may be charged per idle advertisement, i.e., per impression. An advertising party may be charged each time a user focuses on an advertisement and/or may be charged based on how long a user focuses on an advertisement. An advertising party may be charged based on the user interaction with an advertisement that occurs and/or whether the user clicks through the advertisement. Various combinations and variations of the above charging structures can also be used.

General

Certain embodiments relate to the use of navigation-triggered advertisements on mobile devices. These are merely illustrative and the techniques described herein have uses in other embodiments, including on a variety of different television and computing devices. In short, the techniques for advertising and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown as functional or storage components on the respective devices. As is known to one of skill in the art, such applications may be resident in any suitable computer-readable medium and execute on any suitable processor. For example, computing and media consuming devices each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, JavaScript, and Adobe® Actionscript.

While the network 100 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a remote control, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs.

That which is claimed:

1. A computer implemented method comprising:
providing a navigation area for an electronic device, the navigation area comprising a plurality of items, wherein a focus indicator distinguishes a focused item from other items of the plurality of items within the navigation area, wherein input on the electronic device changes the focus indicator to change which of the plurality of items is the focused item;
providing a preview area for the electronic device, the preview area displayed simultaneously with and separate from the navigation area, the preview area displaying preview content associated with the focused item;
monitoring an amount of idle time since a last input on the electronic device, wherein an advertisement is triggered when the amount of idle time since the last input on the electronic device exceeds a threshold value, wherein the advertisement is selected from a plurality of received advertisements based on the focused item; and
when the advertisement is triggered, providing the advertisement on the preview area on the electronic device.

2. The method of claim 1, wherein providing the advertisement on the electronic device comprises providing the advertisement until input is received on the electronic device.

3. The method of claim 1 further comprising receiving input, wherein a first type of input on the electronic device cause removal of the advertisement and a second type of input on the electronic device initiates interactivity with the advertisement.

4. The method of claim 1, wherein the advertisement is interactive and comprises one or more of a link to content external to the electronic device, a link to content within the electronic device, and a trigger item for triggering the launch of an application or channel.

5. The method of claim 1, wherein items of the plurality of items correspond to cached content on the electronic device.

6. The method of claim 1, wherein the navigation area comprises a carousel comprising the plurality of items.

7. The method of claim 6, wherein the plurality of items correspond to channels and the focused item corresponds to a focused channel.

8. The method of claim 7, wherein the preview content displays a preview of content that is now playing on the focused channel.

9. The method of claim 8, wherein the content that is now playing on the focused channel is received from a channel provider remote from the electronic device based on a subscription to the channel.

10. The method of claim 1, wherein the electronic device is a mobile device.

11. The method of claim 1, wherein the electronic device comprises a control device for controlling focus of the focus indicator.

12. The method of claim 1 further comprising displaying the carousel as inactive while the advertisement is on the preview area.

13. The method of claim 1, wherein at least a portion of the navigation area is displayed on the electronic device.

14. A computer implemented method comprising:
receiving a plurality of channels at a mobile device, each channel available to the mobile device upon subscription and used to receive and cache content for the mobile device from a channel content provider;

running a channel preview application on the mobile device for previewing content of the plurality of channels, a navigation area of the channel preview application comprising a carousel comprising a plurality of channel icons, wherein a focus indicator distinguishes a channel icon from other channel icons of the plurality of channel icons within the carousel, wherein at least a portion of the carousel is displayed on the mobile device and input on the mobile device changes which of the channel icons is distinguished by the focus indicator to change which of the plurality of channels is a focused channel;

monitoring an amount of idle time since a last input on the mobile device, wherein an advertisement is triggered when the amount of idle time since the last input on the mobile device exceeds a threshold value, wherein the advertisement is selected from a plurality of received advertisements based on the focused channel; and when the advertisement is triggered, providing the advertisement on the mobile device, wherein the advertisement is provided in a preview area separate from the navigation area on the mobile device.

15. The method of claim 14, wherein providing the advertisement on the mobile device comprises providing the advertisement until input is received on the mobile device.

16. The method of claim 14 further comprising receiving input on the mobile device, wherein a first type of input on the mobile device causes removal of the advertisement and a second type of input on the electronic device initiates interactivity with the advertisement.

17. The method of claim 14, wherein the advertisement is interactive and comprises one or more of a link to content external to the electronic device, a link to content within the electronic device, and a trigger item for triggering the launch of an application or channel.

18. The method of claim 14, wherein the electronic device comprises a control device for controlling focus of the focus indicator.

19. An electronic device system comprising:
a memory;
a processor; and
wherein the memory is encoded with one or more applications that, when performed on the processor, cause the system to perform the operations comprising:
providing a navigation area comprising a plurality of items and a focus indicator that distinguishes a focused item from other items of the plurality of items, wherein at least a portion of the navigation area is displayed on the electronic device system and input on the electronic device system changes the focus indicator to change which of the plurality of items is the focused item;
providing a preview area for the electronic device, the preview area displayed simultaneously with and separate from the navigation area, the preview area displaying preview content associated with the focused item; and
monitoring an amount of idle time since a last input on the electronic device system and triggering an advertisement when the amount of idle time since the last input on the electronic device system exceeds a threshold value, wherein the advertisement is selected from a plurality of received advertisements based on the focused item;
displaying the advertisement in the preview area when the advertisement is triggered.

20. The electronic device system of claim 19, wherein the electronic device system is a mobile device.

21. A non-transitory computer-readable medium on which is encoded program code, the program code comprising:
program code, which when executed via a processor, provides a navigation area for an electronic device, the navigation area comprising a plurality of items, wherein a focus indicator distinguishes a focused item from other items of the plurality of items within the navigation area, wherein input on the electronic device changes the focus indicator to change which of the plurality of items is the focused item;
program code, which when executed via a processor, provides a preview area for the electronic device, the preview area displayed simultaneously with and separate from the navigation area, the preview area displaying preview content associated with the focused item;
program code, which when executed via a processor, monitors an amount of idle time since a last input on the electronic device, wherein an advertisement is triggered when the amount of idle time since the last input on the electronic device exceeds a threshold value, wherein the advertisement is selected from a plurality of received advertisements based on the focused item; and
program code, which when executed via a processor, when the advertisement is triggered, provides the advertisement on the preview area on the electronic device.

* * * * *